US011850923B2

United States Patent
Ishikura et al.

(10) Patent No.: US 11,850,923 B2
(45) Date of Patent: Dec. 26, 2023

(54) VEHICLE SUN VISOR EQUIPPED WITH CARD HOLDER

(71) Applicant: KYOWA SANGYO CO., LTD., Toyota (JP)

(72) Inventors: Kunihiko Ishikura, Toyota (JP); Takashi Haraguchi, Toyota (JP)

(73) Assignee: KYOWA SANGYO CO., LTD., Toyota (JP)

( * ) Notice: Subject to any disclaimer, the term of this patent is extended or adjusted under 35 U.S.C. 154(b) by 64 days.

(21) Appl. No.: 17/637,991

(22) PCT Filed: Aug. 25, 2020

(86) PCT No.: PCT/JP2020/032023
§ 371 (c)(1),
(2) Date: Feb. 24, 2022

(87) PCT Pub. No.: WO2021/044905
PCT Pub. Date: Mar. 11, 2021

(65) Prior Publication Data
US 2022/0274470 A1  Sep. 1, 2022

(30) Foreign Application Priority Data
Sep. 4, 2019  (JP) .................. 2019-161158

(51) Int. Cl.
*B60J 3/02* (2006.01)
*B60R 7/05* (2006.01)
*B60R 7/08* (2006.01)

(52) U.S. Cl.
CPC ............... *B60J 3/0278* (2013.01); *B60R 7/05* (2013.01); *B60R 7/08* (2013.01)

(58) Field of Classification Search
CPC .................. B60J 3/0278; B60J 3/0204; B60R 2011/0035
USPC ........................................................ 296/97.5
See application file for complete search history.

(56) References Cited

FOREIGN PATENT DOCUMENTS

| JP | 2895380 | B2 | * | 5/1999 |
| JP | 2003165333 | A | * | 6/2003 |
| JP | 2003-205739 | A |  | 7/2003 |
| JP | 2003205739 | A | * | 7/2003 |
| JP | 2003237480 | A | * | 8/2003 |
| KR | 000114618 | Y1 | * | 4/1998 |
| KR | 2002040180 | A | * | 5/2002 |
| KR | 2003041322 | A | * | 5/2003 |
| KR | 101199699 | B1 | * | 11/2012 |

* cited by examiner

*Primary Examiner* — Amy R Weisberg
*Assistant Examiner* — Veronica M Shull
(74) *Attorney, Agent, or Firm* — Oliff PLC (57) ABSTRACT

A vehicle sun visor has: a hollow plate-like visor body; and a card holder fitted to the visor body. The visor body has an opening that is formed in a first component of the visor body, and a pair of rails that extend from both ends of the opening on the backside of the first component. The card holder has, integrally, an annular bezel along the opening, and a holder body extending from one side of the bezel over the other side thereof. The holder body has both edges that are held on the rails, and a projection piece that is located on a side opposite to the bezel and is held on the visor body.

6 Claims, 9 Drawing Sheets

VEHICLE SUN VISOR EQUIPPED WITH CARD HOLDER

TECHNICAL FIELD

The present invention relates to a vehicle sun visor including a card holder.

BACKGROUND ART

Patent Document 1 describes a vehicle sun visor including a visor body and a card holder provided in the visor body. The visor body includes a first shell body and a second shell body laminated in the thickness direction, and a hollow region is formed between the first shell body and the second shell body. The card holder includes an opening frame body attached to the first shell body and a card holding portion formed in the second shell body.

The opening frame body is attached around an opening formed in the first shell body. The opening frame body has a card insertion opening into which a card is inserted, at a position corresponding to the opening of the first shell body. The card holding portion is placed inside the visor body and holds the card inserted into the visor body. The card holding portion includes a plurality of projection pieces projecting from the inner surface of the second shell body toward the first shell body. The card is inserted into a card storage portion between distal ends of the projection pieces and the inner surface of the first shell body.

The opening frame body includes a plurality of locking portions pushed into attachment holes formed on the surface of the first shell body. The opening frame body is attached to the first shell body while the opening frame body covers an end of a skin covering the visor body. On that account, the locking portions are pushed into the attachment holes with a relatively large force. Further, the opening frame body is attached to the first shell body, but the card holding portion is formed in the second shell body. This may cause variations of the card storage portion in size or shape due to variations of the first shell body and the second shell body in size or assembly errors.

CITATION LIST

Patent Literatures

Patent Document 1: Japanese Unexamined Patent Application Publication No. 2003-205739 (JP 2003-205739 A)

SUMMARY OF THE INVENTION

Problem to be Solved by the Invention

In view of this, conventionally, there has been requested a sun visor including a card holder that can be easily assembled to a visor body or a card holder that can accurately constitute a card storage portion having a desired shape.

Means for Solving the Problem

According to one feature of this disclosure, a vehicle sun visor equipped with a card holder includes a hollow plate-shaped visor body and the card holder mounted to the visor body. The visor body includes an opening formed in a first component of the visor body, and paired rails extending from both ends of the opening on a backside of the first component. The card holder integrally includes a generally annular bezel along the opening, and a holder body extending from a first side of the bezel over an opposite second side. The holder body includes both edges held by the paired rails, and a distal end positioned on a side opposite to the bezel and held by the visor body.

Accordingly, in a case where the card holder is assembled to the visor body, the holder body is inserted into the visor body from the opening of the first component. Both edges of the holder body are slid along the paired rails. The distal end of the holder body is held by the visor body. Accordingly, by use of the paired rails, the card holder can be easily assembled to the visor body.

Besides, the holder body is held by the paired rails formed on the backside of the first component of the visor body. Accordingly, the shape of a card storage portion formed between the holder body and the backside of the first component can be determined by the first component of the visor body. Accordingly, variations of the card storage portion in shape can be reduced in comparison with a conventional structure, that is, a structure in which a card storage portion is formed between the first component and a second component of the visor body. Further, the card holder integrally includes the bezel and the holder body and is assembled to the same surface as the visor body. Accordingly, the card holder is assembled to the visor body with a large area, so that the card holder can be stably held by the visor body.

According to another feature of this disclosure, the paired rails include respective vertical walls extending from the backside of the first component, and respective overhanging portions overhanging from end parts of the vertical walls to a back surface of the holder body such that the overhanging portions hold the both edges of the holder body. Accordingly, the movement of the holder body in the up-down direction is restricted by the vertical walls of the rails. Besides, the movement of the holder body in the thickness direction is restricted by the overhanging portions. Hereby, the both edges of the holder body can be prevented from being disengaged from the rails. Thus, the holder body is held by the visor body in a stable state.

According to another feature of this disclosure, spacers projecting from the backside of the first component toward the overhanging portions of the paired rails are formed. The spacers form a card storage space by separating the distal end of the holder body from the first component of the visor body. Accordingly, the card storage space is formed by the holder body, the backside of the first component, and the spacers. Besides, the positional relationship between the first component and the holder body hardly changes due to assembling. Thus, the shape of the card storage portion can be easily formed into a desired shape.

According to another feature of this disclosure, an engaged portion recessed or opened in the thickness direction is formed in the distal end of the holder body. An engageable portion projecting from the backside and inserted into the engaged portion of the holder body is formed in the first component of the visor body. Accordingly, the engaged portion of the holder body does not project toward the first component of the visor body. Accordingly, it is possible to restrain the engaged portion from being caught on the first component or a skin at the time when the holder body is inserted into the visor body. On that account, the holder body is easily inserted into the visor body.

According to another feature of this disclosure, the paired rails include vertical walls extending from the backside of the first component, and overhanging portions overhanging from end parts of the vertical walls to a back surface of the holder body such that the overhanging portions hold the both edges of the holder body. Disengagement prevention portions projecting from the overhanging portions toward the backside of the first component are formed in end parts of the paired rails in the longitudinal direction. Since the disengagement prevention portions restrain the distal end of the holder body from moving in a direction distanced from the first component, the engaged portion is restrained from being disengaged from the engageable portion.

For example, there is such a case where a hard and thick card enters between the spacers in the card storage space and an edge of the holder body. Even in this case, the disengagement prevention portions support the back surface of the holder body, so that the distal end of the holder body does not move in the direction distanced from the first component. Thus, by keeping an engaged state between the engaged portion in the distal end of the holder body and the engageable portion of the visor body, the holder body can be held by the visor body.

According to another feature of this disclosure, the paired rails include guide recessed portions between the opening and the disengagement prevention portions. The guide recessed portions facilitate insertion of the holder body into the paired rails at the time when the holder body is assembled to the visor body. Accordingly, the holder body can be inserted into the visor body without greatly curving the holder body. Since deformation of the holder body at the time of assembling can be prevented as such, the shape of the card storage portion can be easily formed into a desired shape.

According to another feature of this disclosure, a maintenance opening where the engaged portion is exposed is formed in the first component. Accordingly, in a case where maintenance is performed by removing the card holder from the visor body, for example, the engaged portion thus exposed can be pushed toward the backside of the first component from the front side of the first component. Thus, the card holder can be removed from the visor body by removing the engageable portion of the visor body from the engaged portion of the holder body.

According to another feature of this disclosure, the paired rails extending from both ends of the opening on the backside of the first component extend in parallel to each other. The both edges of the holder body are parallel to each other. Accordingly, when the holder body is slid along the rails, the sliding is smooth. On that account, the card holder can be easily attached and detached.

MODES FOR CARRYING OUT THE INVENTION

Figure 1:
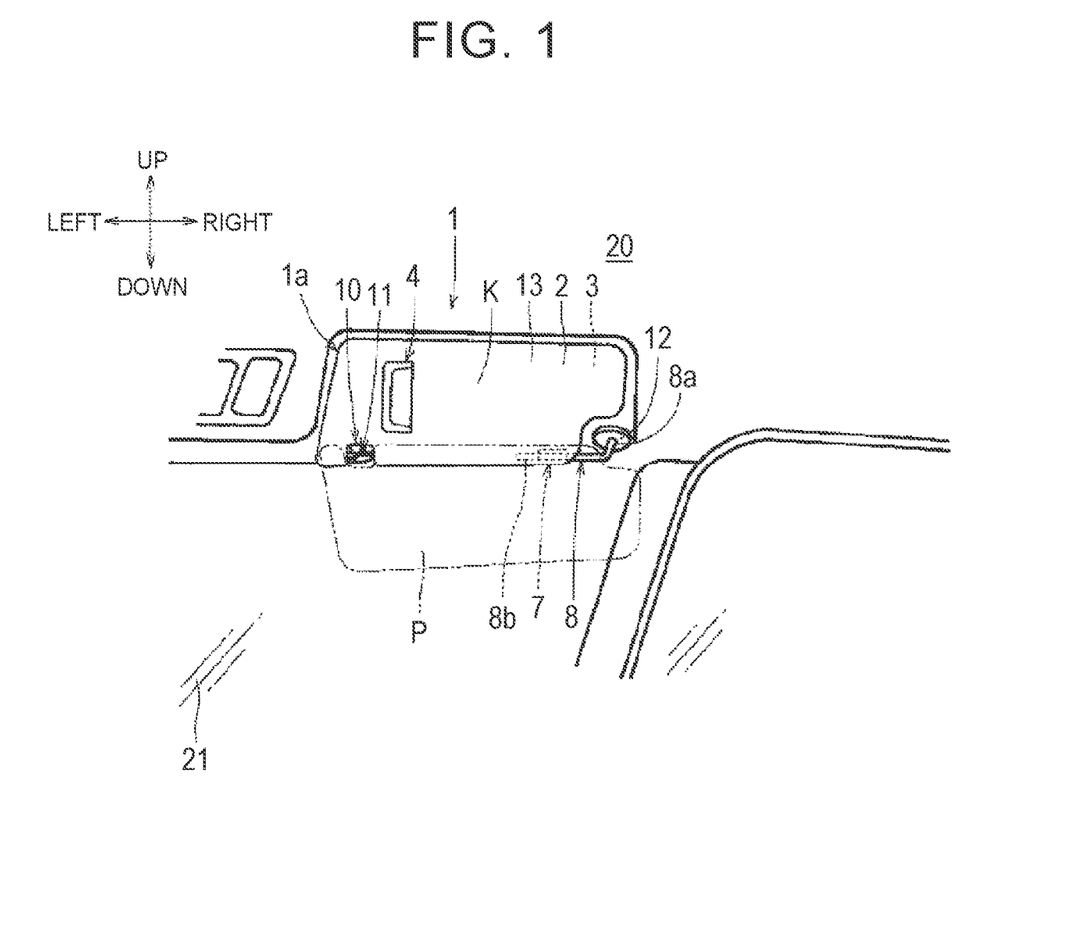
FIG. 1 is a perspective view of part of an inner part of a vehicle and a sun visor attached to a vehicle ceiling.

One embodiment of the present invention will be described with reference to FIGS. 1 to 8. As illustrated in FIG. 1, a vehicle sun visor 1 is attached to a ceiling surface 20 near a windshield 21 inside a vehicle cabin. The vehicle sun visor 1 includes a visor body 1a, a support shaft 8, and a card holder 4 provided on the surface of the visor body 1a.

As illustrated in FIG. 1, the visor body 1a has a generally rectangle shape and includes a first component 2 and a second component 3 having a flat-shape and laminated in the thickness direction. The surface of the visor body 1a is covered with a skin 13. The support shaft 8 is a generally L-shaped bar, and a vertical shaft 8a extends upward from a distal end of a horizontal shaft 8b such that the vertical shaft 8a is generally perpendicular to the horizontal shaft 8b. A bracket 12 is mounted to a distal end of the vertical shaft 8a, and the bracket 12 is attached to the ceiling surface 20 of the vehicle cabin. The support shaft 8 configured to rotatably support the visor body 1a is mounted to the visor body 1a via a clip 7 assembled to a bearing portion (not illustrated).

As illustrated in FIG. 1, a shaft 11 is removably held by a hook 10 fixed to the ceiling surface 20. When the shaft 11 is attached to the hook 10, the visor body 1a rotates around the shaft 11 and the horizontal shaft 8b between a usage position P along the windshield 21 and a storage position K along the ceiling surface 20.

Figure 2:
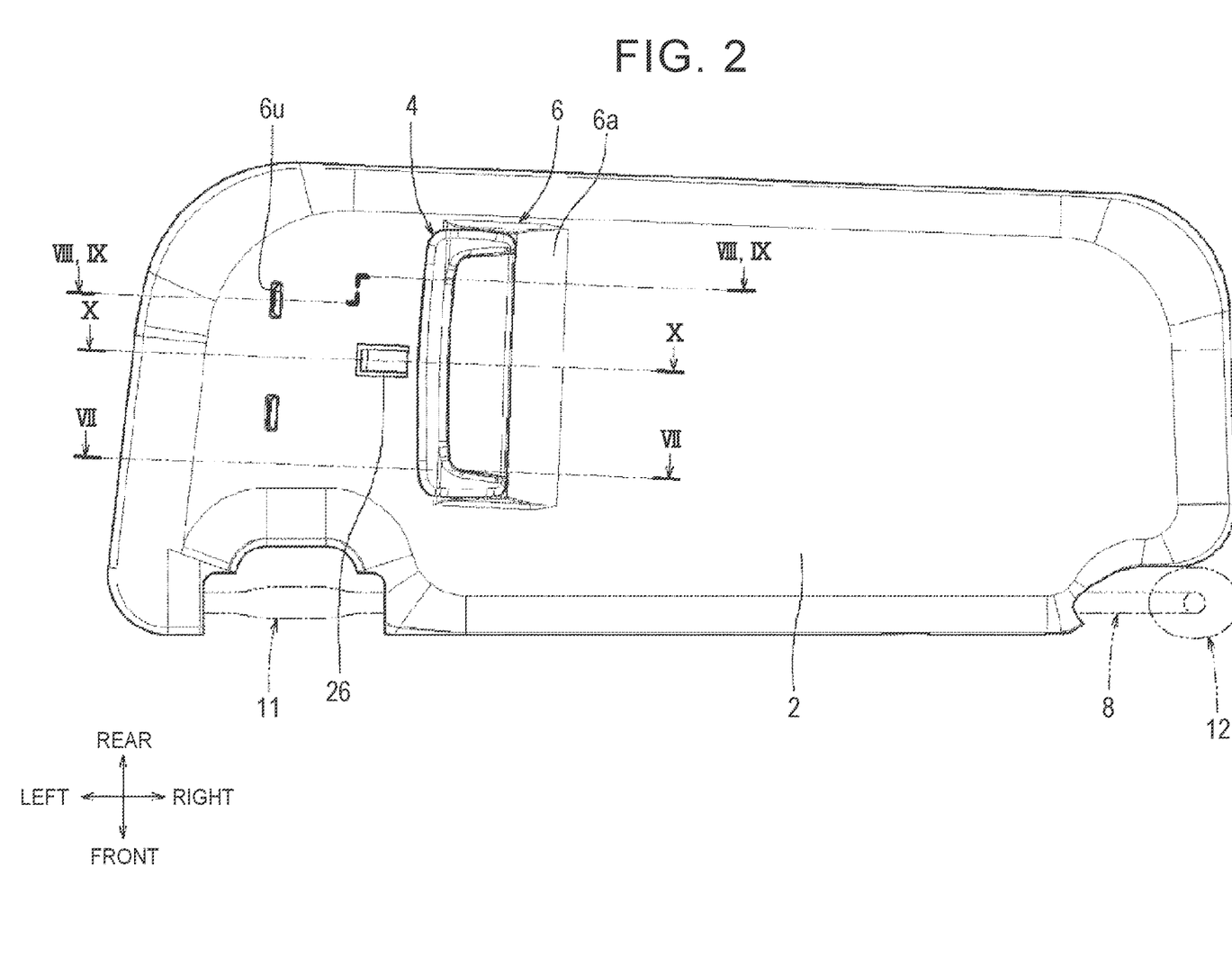
FIG. 2 is a front view of a first core of a visor body.
Figure 3:
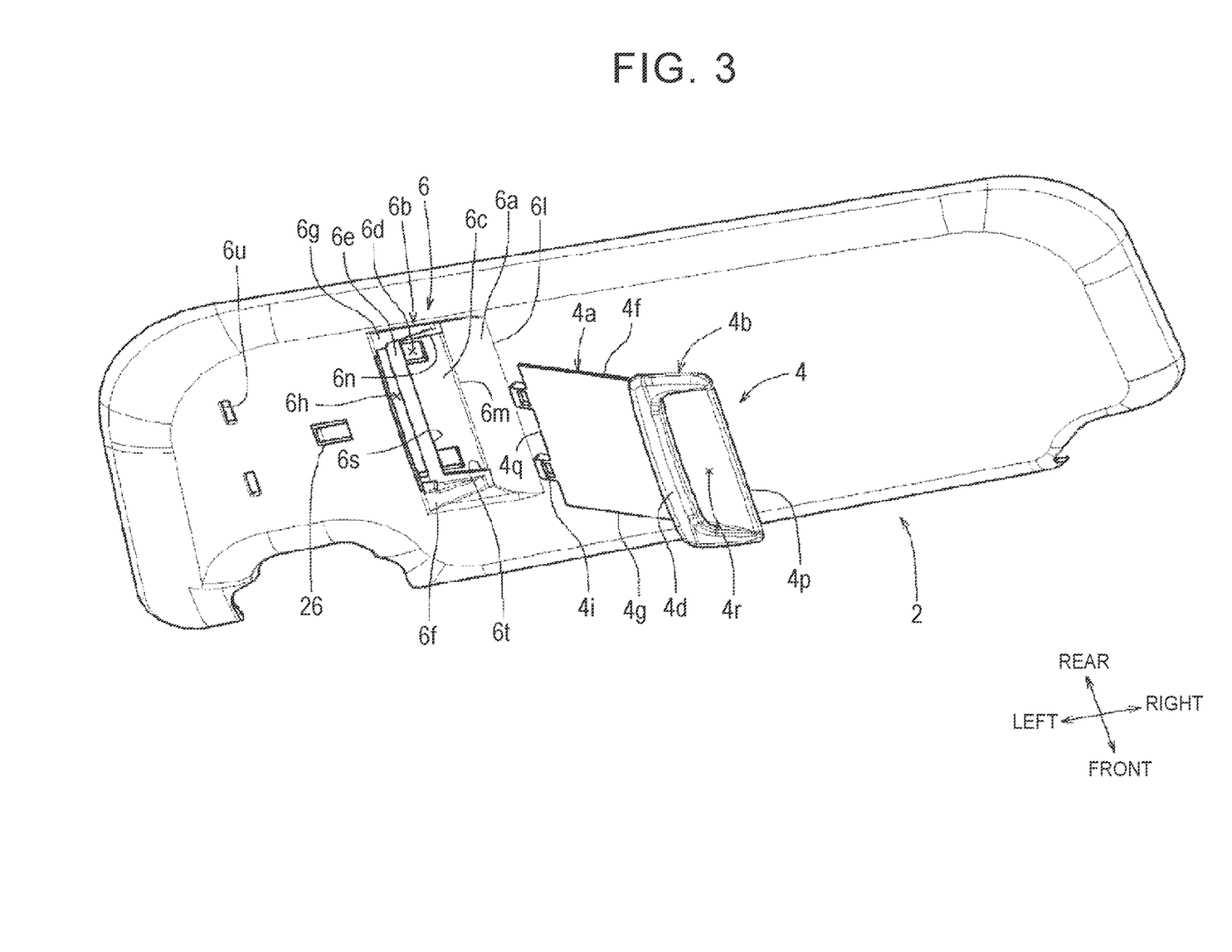
FIG. 3 is an exploded perspective view of a first component of the visor body and a card holder.
Figure 6:
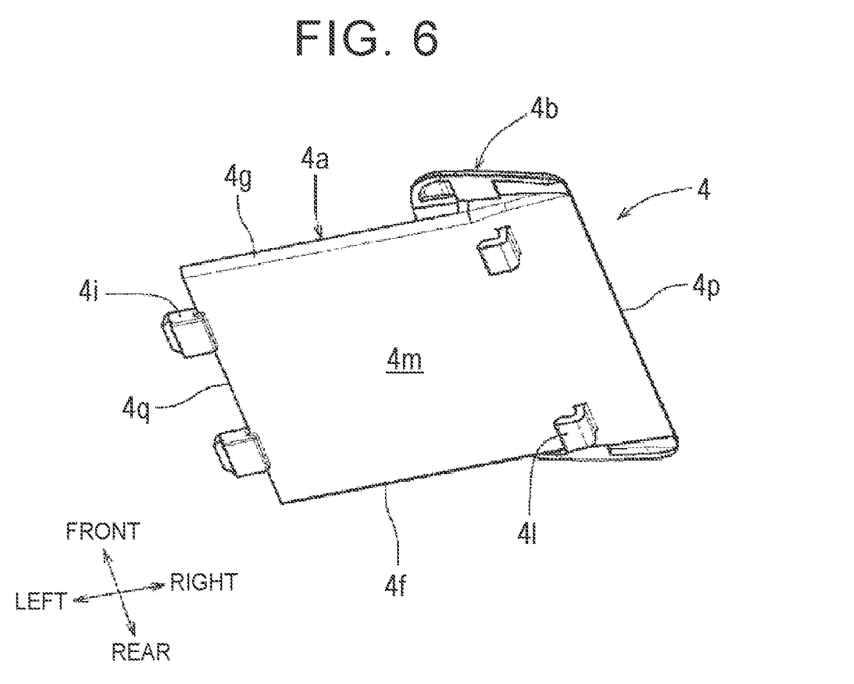
FIG. 6 is a back-face perspective view of the card holder.

As illustrated in FIGS. 2, 3, 6, a holder attachment portion 6 to which the card holder 4 is mounted is provided in a central left-sided region of the first component 2. The holder attachment portion 6 includes a recessed surface portion 6a configured to guide insertion of a card C, a holder mounting portion 6b in which a bezel 4b is stored, attachment holes 6d fitting detent portions 4l for fixing the card holder 4, and an opening 6h into which a holder body 4a of the card holder 4 is inserted. On the left side of the holder attachment portion 6, two maintenance openings 6u are provided, for example. The two maintenance openings 6u are disposed such that projection pieces 4i of the holder body 4a mounted to the holder attachment portion 6 are exposed (see FIG. 8).

Figure 4:
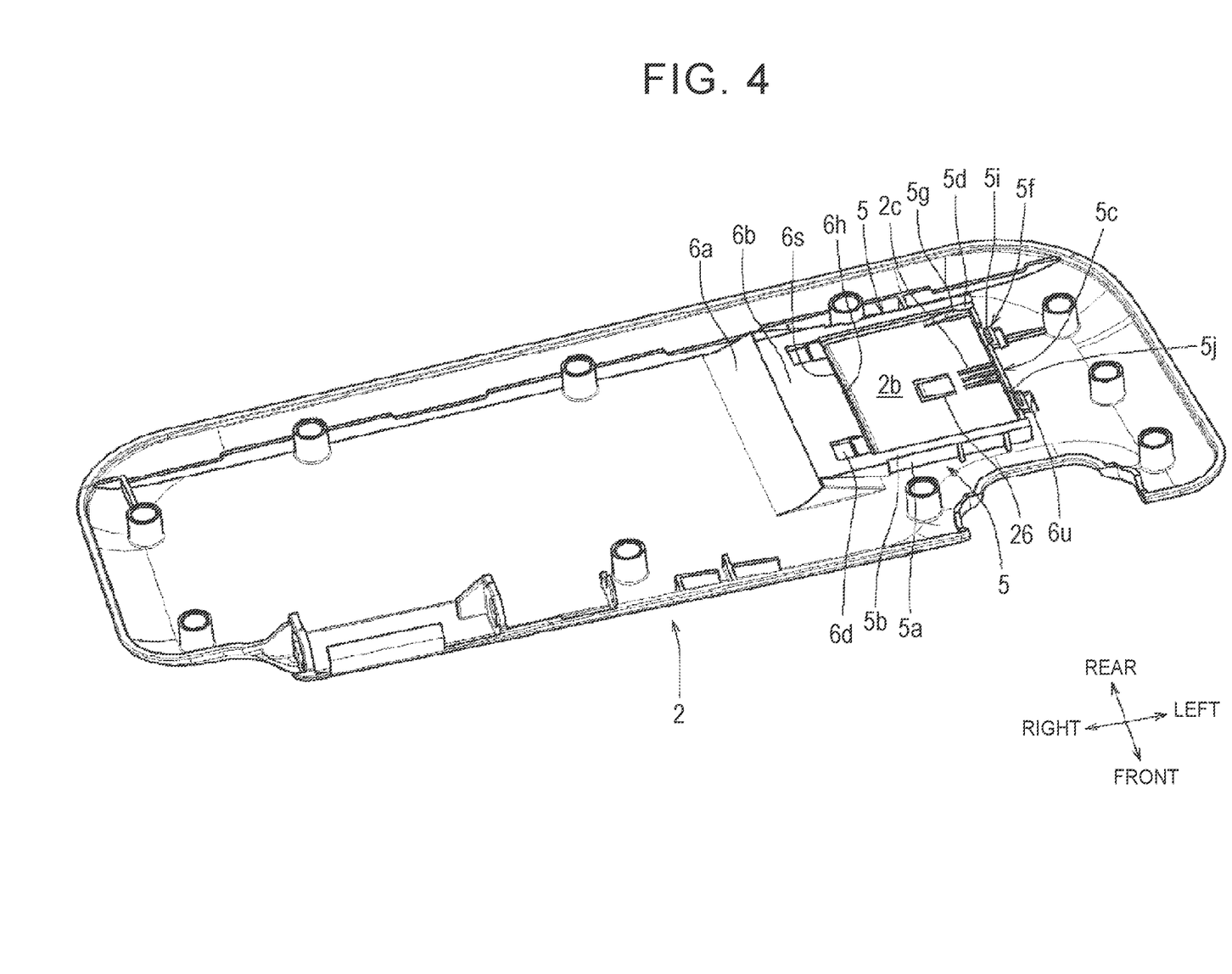
FIG. 4 is a back-face perspective view of the first component of the visor body.
Figure 8:
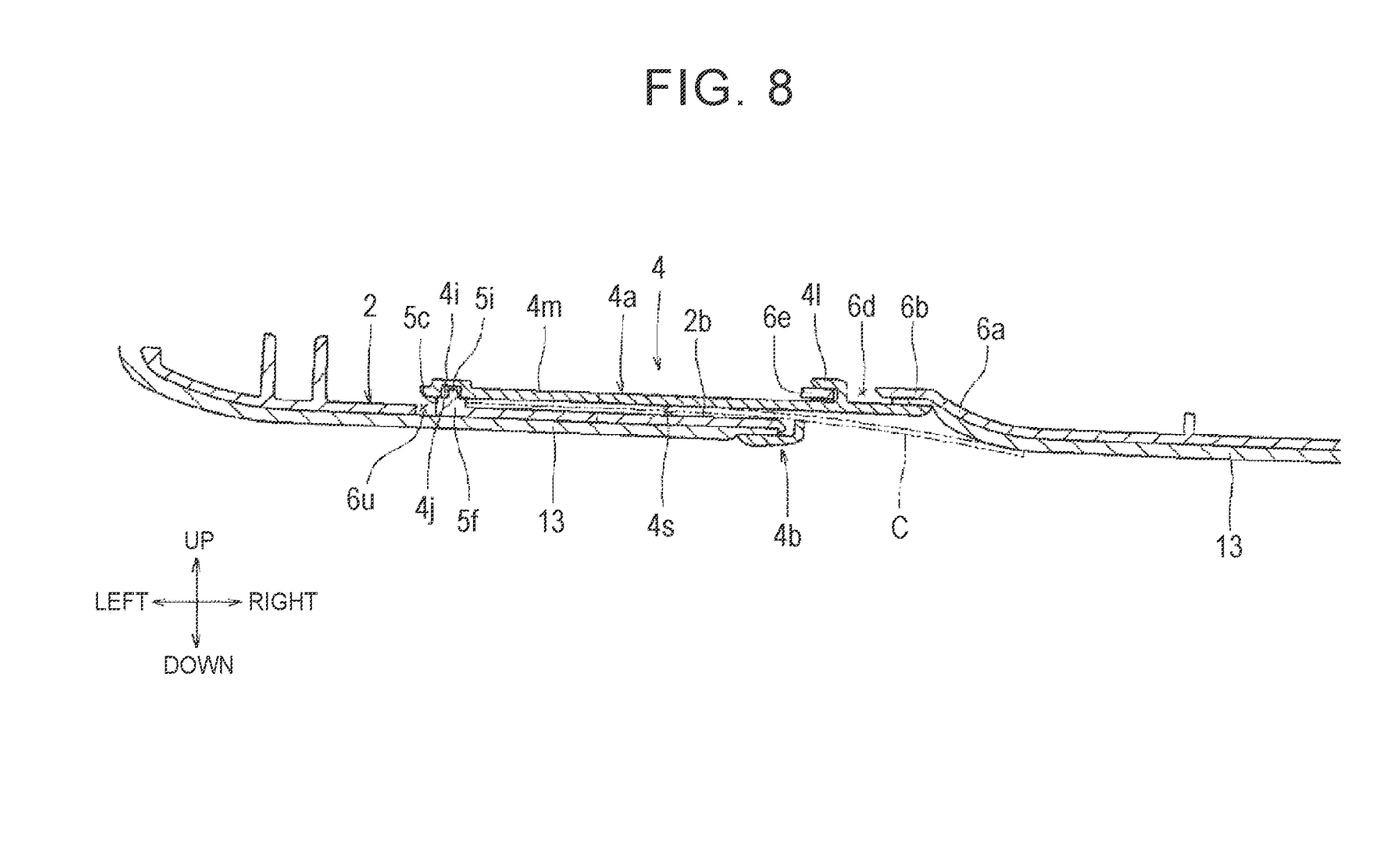
FIG. 8 is an arrow view of a section taken along a line VIII-VIII in FIG. 2.

As illustrated in FIGS. 2 to 4, the recessed surface portion 6a of the holder attachment portion 6 is inclined toward a right side 6l of the holder attachment portion 6, that is, to the left direction from a generally center of the first component 2 and also toward a backside 2b of the first component 2. As illustrated in FIG. 8, the recessed surface portion 6a guides the card C when the card C is inserted into the card holder 4, so that the card C is inserted smoothly. The card C inserted into the card holder 4 abuts with the recessed surface portion 6a and curves. Thus, the recessed surface portion 6a generates retentive power between the recessed surface portion 6a and the card C so as to prevent the card C from falling from the card holder 4 due to vibration or the like.

As illustrated in FIG. 3, the holder mounting portion 6b includes a flat surface portion 6c, an intermediate frame portion 6e, and inclined walls 6f, 6g. The flat surface portion 6c has a trapezoidal shape expanding in parallel to the first component 2 from a bottom side 6m of the recessed surface portion 6a and includes a rear side 6n, a front side 6t, and a left side 6s. The attachment holes 6d having a generally rectangular shape are formed in a left region of the flat surface portion 6c at an interval in the front-rear direction.

Figure 7:
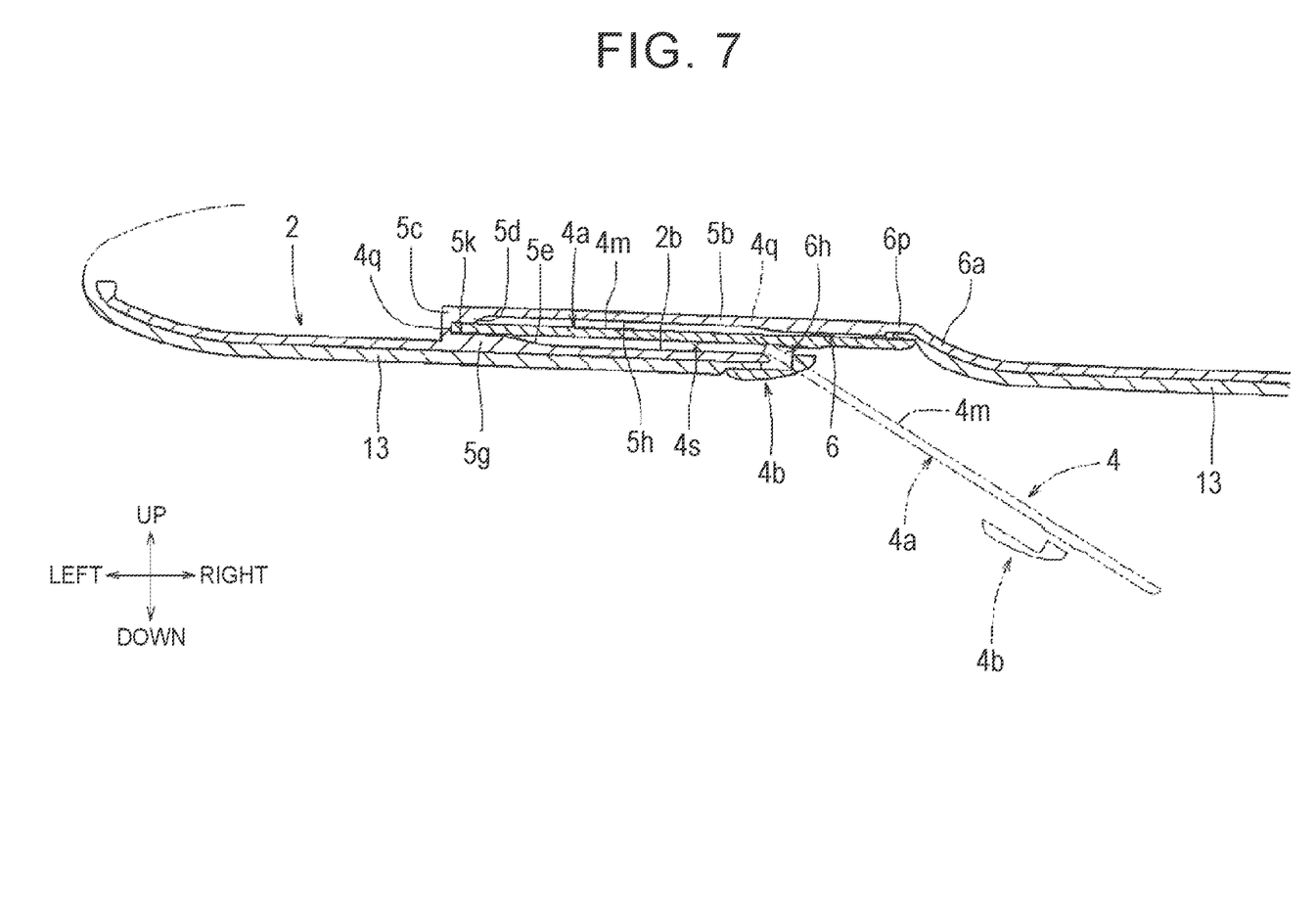
FIG. 7 is an arrow view of a section taken along a line VII-VII in FIG. 2.

As illustrated in FIGS. 4, 7, paired rails 5 are provided on the backside 2b of the first component 2. The paired rails 5 hold the holder body 4a slidably. Each of the rails 5 includes a vertical wall 5a and an overhanging portion 5b. The vertical walls 5a project generally vertically from the backside 2b of the first component 2 and extend from a front edge and a rear edge of the opening 6h, respectively, so as to be parallel to each other in the longitudinal direction of the first component 2. The overhanging portion 5b overhangs over a back surface 4m of the holder body 4a from an edge of the vertical wall 5a toward its opposite vertical wall 5a on the other side (see FIG. 6). The overhanging portions 5b support a front edge portion (a front side 4g) and a rear edge portion (a rear side 4f) of the holder body 4a (see FIG. 5). As illustrated in FIG. 4, respective left ends of the vertical walls 5a are connected to each other via a stopper wall 5c.

As illustrated in FIGS. 4, 7, 8, the stopper wall 5c with which a distal end 4q of the holder body 4a abuts at the time when the holder body 4a is inserted projects generally vertically from the backside 2b of the first component 2 and extends in the front-rear direction. The stopper wall 5c includes, for example, two recessed portions 5j provided at an interval in the front-rear direction, and projecting portions 5f projecting to the left direction from the recessed portions 5j, respectively. The projecting portions 5f have a generally square shape. On one surface of the projecting portion 5f that faces the holder body 4a, an engageable portion 5i projecting in the vertical direction to the holder body 4a is provided. The engageable portion 5i fits a recessed portion 4j of the projection piece 4i of the holder body 4a (see FIG. 5). Thus, the holder body 4a is held by the first component 2.

As illustrated in FIGS. 4, 7, a spacer 5g to form a card storage portion 4s is provided between the backside 2b of the first component 2 and each of the overhanging portions 5b. Each spacer 5g is formed as a flat portion 5k to which an inclined portion 5e for guiding the distal end 4q of the holder body 4a at the time when the holder body 4a is inserted and an insertion end are fixed.

As illustrated in FIG. 4, the overhanging portion 5b is provided with a disengagement prevention portion 5d in a part facing the spacer 5g. The disengagement prevention portion 5d projects generally in the vertical direction from an edge of the overhanging portion 5b toward the backside 2b of the first component 2. The overhanging portion 5b includes a guide recessed portion 5h provided to be recessed upward between the vicinity of the opening 6h of the holder attachment portion 6 and the disengagement prevention portion 5d, as illustrated in FIG. 7.

Figure 5:
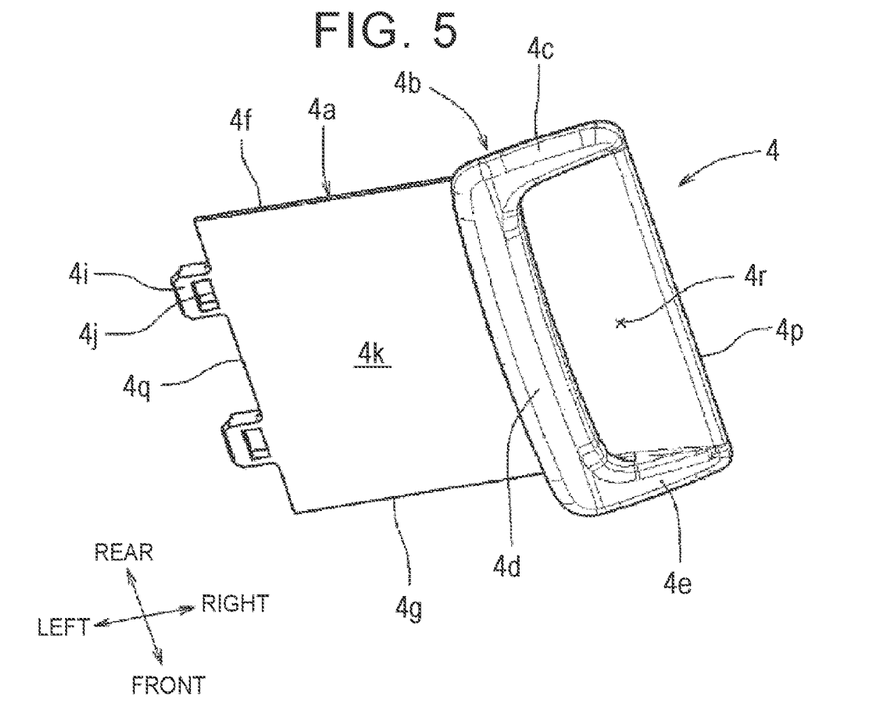
FIG. 5 is a front perspective view of the card holder.

As illustrated in FIGS. 5, 6, the card holder 4 includes the holder body 4a and a bezel portion 4b. The holder body 4a has a generally flat-plate shape. The projection pieces 4i extending from the distal end 4q are provided in the distal end 4q of the holder body 4a. For example, two projection pieces 4i are provided such that the two projection pieces 4i are distanced at a predetermined interval from a central region of the distal end 4q toward both ends. In a generally center of a first surface of each of the projection pieces 4i, the recessed portion 4j is formed in the thickness direction.

As illustrated in FIG. 8, the engageable portion 5i of the projecting portion 5f of the stopper wall 5c illustrated in FIG. 4 fits the recessed portion 4j. As illustrated in FIG. 6, generally L-shaped detent portions 4l placed to be distanced from each other in the front-rear direction are provided in the vicinity of a right side 4p on the back surface 4m of the holder body 4a. When the detent portions 4l are inserted into the attachment holes 6d, the holder body 4a is held by the first component 2.

As illustrated in FIGS. 5, 6, the bezel portion 4b has a generally U-shape and includes a plate-shaped longitudinal frame portion 4d and lateral frame portions 4c, 4e. The bezel portion 4b and the right side 4p of the holder body 4a form a card insertion opening 4r having a generally annular shape. The lateral frame portions 4c, 4e of the bezel portion 4b extend to the left direction from a front end and a rear end of the right side 4p of the holder body 4a, respectively, and also to a diagonal direction such that the lateral frame portions 4c, 4e are separated from a front surface 4k of the holder body 4a. The lateral frame portions 4c, 4e are provided to protrude in the front-rear direction from the right side 4p of the holder body 4a. Respective left-side distal ends of the lateral frame portions 4c, 4e are connected to each other via the longitudinal frame portion 4d. The longitudinal frame portion 4d extends in parallel to the right side 4p and the distal end 4q of the holder body 4a.

When the card holder 4 is mounted to the holder attachment portion 6 of the first component 2, the holder body 4a is inserted into the opening 6h of the first component 2 as illustrated in FIG. 3. More specifically, as illustrated in FIGS. 3, 7, the card holder 4 is inserted in a state where the holder body 4a is inclined such that a front end and a rear end of the distal end 4q of the holder body 4a abut with the overhanging portions 5b of the rails 5. Then, the front side 4g and the rear side 4f of the holder body 4a are slid along the rails 5. The projection pieces 4i are moved to the depth side (the left side) of the rails 5 by gradually reducing the inclination of the holder body 4a to the first component 2. The holder body 4a is slid until the distal end 4q of the holder body 4a abuts with the stopper wall 5c.

When the distal end 4q of the holder body 4a abuts with the stopper wall 5c as illustrated in FIG. 7, the distal end 4q of the holder body 4a is placed between the disengagement prevention portion 5d and the spacer 5g. As illustrated in FIG. 8, the recessed portion 4j of the projection piece 4i of the holder body 4a fits the engageable portion 5i of the stopper wall 5c. Further, the detent portions 4l are inserted into the attachment holes 6d and engaged with the intermediate frame portion 6e. Thus, the card storage portion 4s is formed between the holder body 4a and the backside 2b of the first component 2.

As described above, the vehicle sun visor 1 equipped with the card holder includes the hollow plate-shaped visor body 1a and the card holder 4 mounted to the visor body 1a as illustrated in FIGS. 1 to 8. The visor body 1a includes the opening 6h formed in the first component 2 of the visor body 1a, and the paired rails 5 extending from both ends of the opening 6h on the back surface of the first component 2. The card holder 4 integrally includes the annular bezel 4b along the opening 6h, and the holder body 4a extending from a first side (4p) of the bezel 4b over an opposite second side (4d). The holder body 4a includes both edges (4f, 4g) held by the paired rails 5, and engaged portions (projection pieces) 4i placed on the opposite side to the bezel 4b and held by the visor body 1a.

Accordingly, in a case where the card holder 4 is assembled to the visor body 1a, the holder body 4a is inserted into the visor body 1a from the opening 6h. The both edges (4f, 4g) of the holder body 4a are slid along the paired rails 5. The engaged portions 4i of the holder body 4a are held by the visor body 1a. Accordingly, by use of the rails 5, the card holder 4 can be easily assembled to the visor body 1a.

Besides, the holder body 4a is held by the rails 5 formed on the backside 2b of the first component 2 of the visor body 1a. Accordingly, the shape of the card storage portion 4s formed between the holder body 4a and the backside 2b of the first component 2 can be determined by the first component 2 of the visor body 1a. Accordingly, variations of the card storage portion 4s in shape can be reduced in comparison with a conventional structure, that is, a structure in which a card storage portion is formed between the first component 2 and the second component 3 of the visor body. Further, the card holder 4 integrally includes the bezel 4b and the holder body 4a and is assembled to the same surface as the visor body 1a. On this account, the card holder 4 is assembled to the visor body 1a with a large area, so that the card holder 4 is stably held by the visor body 1a.

As illustrated in FIGS. 4, 5, 7, the paired rails 5 include respective vertical walls 5a extending from the backside 2b of the first component 2, and respective overhanging portions 5b overhanging from end parts of the vertical walls 5a to the back surface 4m of the holder body 4a so as to hold both edges (4f, 4g) of the holder body 4a. Accordingly, the movement of the holder body 4a in the up-down direction is restricted by the vertical walls 5a of the rails 5. Besides, the movement of the holder body 4a in the thickness direction is restricted by the overhanging portions 5b. Hereby, the both edges (4f, 4g) of the holder body 4a can be prevented from being disengaged from the rails 5. Thus, the holder body 4a is held by the visor body 1a in a stable state.

As illustrated in FIGS. 4, 7, the spacers 5g projecting from the backside 2b of the first component 2 toward the overhanging portions 5b of the rails 5 are formed. The spacers 5g form a card storage space by separating the distal end 4q of the holder body 4a from the first component 2 of the visor body 1a. Accordingly, the card storage space is formed by the holder body 4a, the backside 2b of the first component 2, and the spacers 5g. Besides, the positional relationship between the first component 2 and the holder body 4a hardly changes due to assembling. Thus, the shape of the card storage portion 4s can be easily formed in a desired shape.

As illustrated in FIGS. 4, 5, 8, the recessed portions 4j recessed or opened in the thickness direction are formed in the engaged portions 4i of the holder body 4a. The engageable portions 5i projecting from the backside 2b and inserted into the recessed portions 4j of the holder body 4a are formed in the first component 2 of the visor body 1a. Accordingly, the recessed portions 4j of the holder body 4a do not project toward the first component 2 of the visor body 1a. Accordingly, it is possible to restrain the engaged portions 4i from being caught on the first component 2 or the skin 13 at the time when the holder body 4a is inserted into the visor body 1a. On that account, the holder body 4a is easily inserted into the visor body 1a.

As illustrated in FIGS. 4, 8, the paired rails 5 include respective vertical walls 5a extending from the backside 2b of the first component 2, and respective overhanging portion 5b overhanging from the end parts of the vertical walls 5a to the back surface 4m of the holder body 4a so as to hold both edges (4f, 4g) of the holder body 4a. In an end part of each of the rails 5 in the longitudinal direction, the disengagement prevention portion 5d projecting from the overhanging portion 5b toward the backside 2b of the first component 2 is formed. Since the disengagement prevention portion 5d restrains the engaged portion 4i of the holder body 4a from moving in a direction distanced from the first component 2, the engaged portion 4i is restrained from being disengaged from the engageable portion 5i.

For example, there is such a case where a hard and thick card C enters between the spacer 5g in the card storage space and an edge of the holder body 4a. Even in this case, since the disengagement prevention portion 5d supports the back surface 4m of the holder body 4a, the engaged portion 4i of the holder body 4a does not move in the direction distanced from the first component 2. Thus, by keeping an engaged state between the engaged portions 4i in the distal end 4q of the holder body 4a and the engageable portions 5i of the visor body 1a, the holder body 4a can be held by the visor body 1a.

As illustrated in FIGS. 4, 7, each of the rails 5 includes the guide recessed portion 5h between the opening 6h and the disengagement prevention portion 5d. The guide recessed portion 5h facilitates insertion of the holder body 4a into the each of the rails 5 at the time when the holder body 4a is assembled to the visor body 1a. Accordingly, the holder body 4a can be inserted into the visor body 1a without greatly curving the holder body 4a. Since deformation of the holder body 4a at the time of assembling can be prevented, the shape of the card storage portion 4s can be easily formed into a desired shape.

As illustrated in FIGS. 2, 4, 8, the maintenance openings 6u where the engaged portions 4i are exposed are formed in the first component 2. Accordingly, in a case where maintenance is performed by removing the card holder 4 from the visor body 1a, for example, the engaged portions 4i thus exposed can be pushed toward the backside of the first component 2 from the front side of the first component 2. Thus, the card holder 4 can be removed from the visor body 1a by removing the engageable portions 5i of the visor body 1a from the engaged portions 4i of the holder body 4a.

As illustrated in FIGS. 4 to 6, the paired rails 5 extending from both ends of the opening 6h extend in parallel to each other on the backside 2b of the first component 2. Both edges (4f, 4g) of the holder body 4a are parallel to each other. Accordingly, when the holder body 4a is slid along the rails 5, the sliding is smooth. On that account, the card holder 4 can be easily attached and detached.

Figure 9:
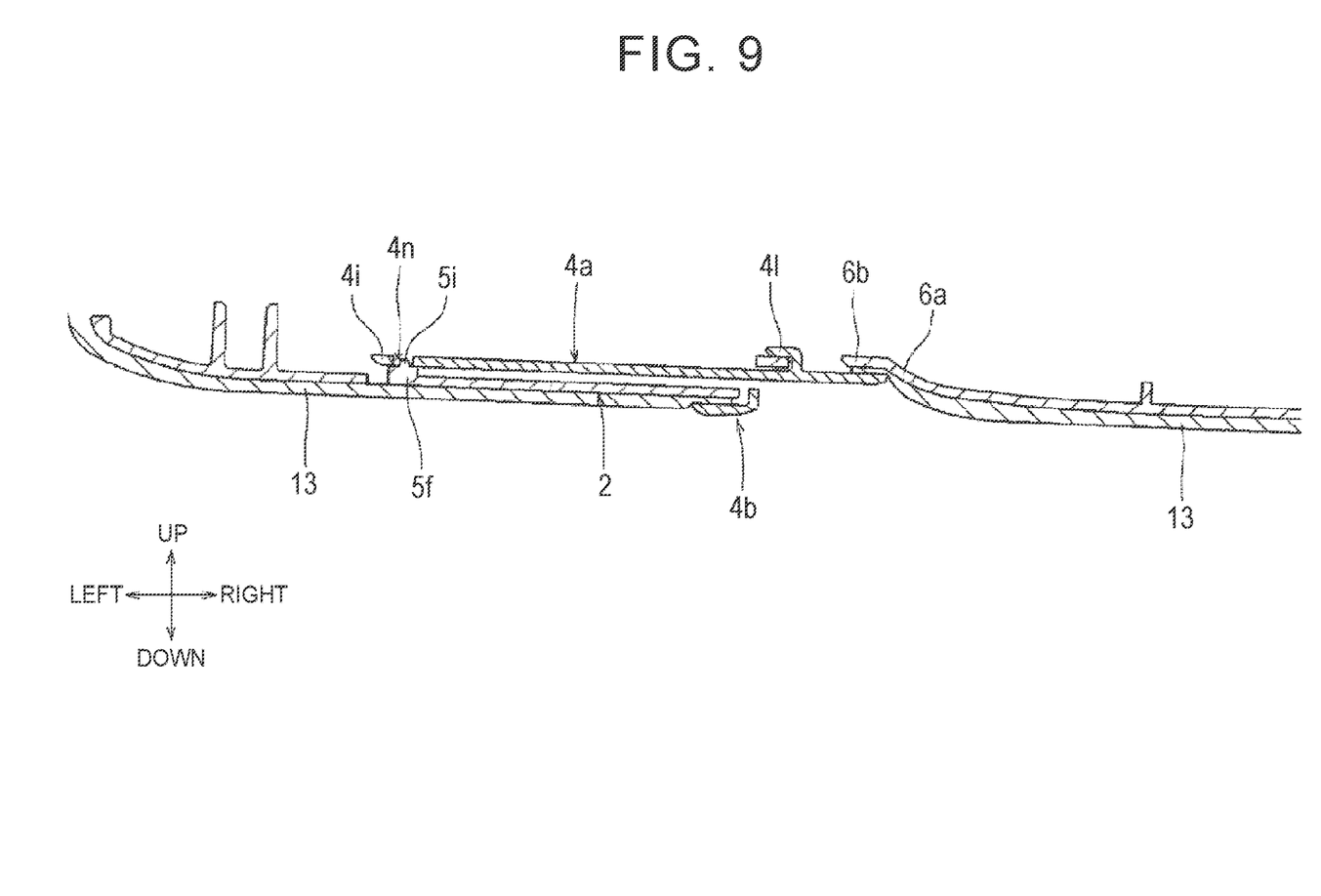
FIG. 9 is an arrow view taken along a line IX-IX in FIG. 2.

This disclosure is not limited to the appearance and the configuration described in the above embodiment, and various changes, addition, or deletion can be made within a range where the gist of the disclosure is not changed. For example, as illustrated in FIGS. 5, 8, in the generally center of the first surface of the projection piece 4i of the holder body 4a, the recessed portion 4j is formed in the thickness direction. Instead of this, a through-hole 4n may be formed in the projection piece 4i of the holder body 4a as illustrated in FIG. 9.

Figure 10:
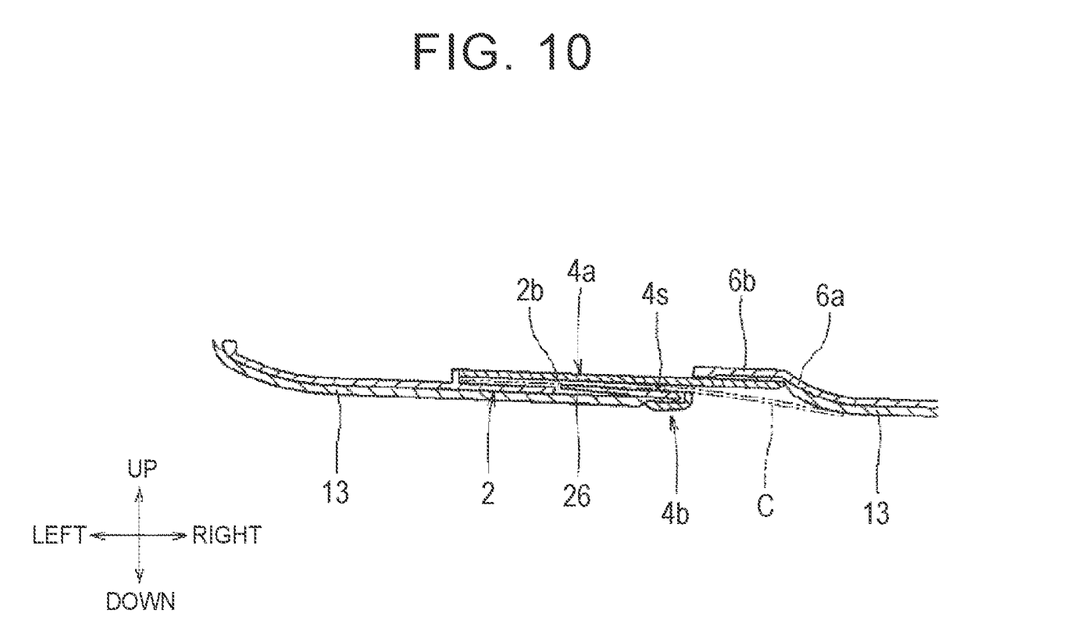
FIG. 10 is an arrow view taken along a line X-X in FIG. 2.

As illustrated in FIGS. 2, 4, 10, a presser bar spring 26 may be provided on the backside 2b of the first component 2. The presser bar spring 26 is a resin spring and is configured such that a right end is connected to the backside 2b and a left end extends in a left diagonal direction to the vicinity of the front surface 4k of the holder body 4a toward the holder body 4a. The presser bar spring 26 presses the card C inserted into the card storage portion 4s against the front surface 4k. Thus, the card C can be held more stably inside the card storage portion 4s.

As illustrated in FIG. 4, pressing slopes 2c may be provided on the backside 2b of the first component 2. Three pressing slopes 2c, for example, extend to the right direction from the vicinity of the stopper wall 5c along the backside 2b of the first component 2. The pressing slopes 2c have an elongated shape and has a tapered shape having a thickness reduced toward the right side. The pressing slopes 2c generate retentive power between the pressing slopes 2*c* and the card C. Thus, the card C is held more stably inside the card storage portion 4*s*.

As illustrated in FIG. 5, the bezel 4*b* has a generally annular shape. Instead of this, the bezel may have a square shape or the like, for example.

DESCRIPTION OF THE REFERENCE NUMERALS

1/ vehicle sun visor
1*a*/ visor body
2/ first component
3/ second component
4/ card holder
4*a*/ holder body
4*b*/ bezel (bezel portion)
4*f*/ rear side (both edges)
4*g*/ front side (both edges)
4*i*/ projection piece (engaged portion)
4*j*/ recessed portion
4*n*/ through-hole (engaged portion)
4*q*/ distal end
5/ rail
5*a*/ vertical wall
5*b*/ overhanging portion
5*d*/ disengagement prevention portion
5*g*/ spacer
5*h*/ guide recessed portion
5*i*/ engageable portion
6*h*/ opening
6*u*/ maintenance opening

The invention claimed is:

1. A vehicle sun visor equipped with a card holder, the vehicle sun visor comprising:
a hollow plate-shaped visor body; and
the card holder mounted to the visor body, wherein:
the visor body includes an opening formed in a first component of the visor body, and paired rails extending from both ends of the opening on a backside of the first component;
the card holder integrally includes a generally annular bezel along the opening, and a holder body extending from a first side of the bezel over an opposite second side; and
the holder body includes two edges held by the paired rails, and a distal end positioned on a side opposite to the bezel, wherein the distal end is held in place by contact with the visor body at a surface of the distal end facing the backside of the first component and at a surface of the distal end facing away from the backside of the first component.

2. The vehicle sun visor equipped with the card holder according to claim 1, wherein the paired rails include vertical walls extending from the backside of the first component, and overhanging portions overhanging from end parts of the vertical walls to a back surface of the holder body such that the overhanging portions hold the two edges of the holder body.

3. The vehicle sun visor equipped with the card holder according to claim 2, wherein spacers projecting from the backside of the first component toward the overhanging portions of the rails are formed such that a card storage space is formed by separating the distal end of the holder body from the first component of the visor body.

4. The vehicle sun visor equipped with the card holder according to claim 1, wherein:
an engaged portion recessed or opened in a thickness direction is formed in the distal end of the holder body; and
an engageable portion projecting from the backside and inserted into the engaged portion of the holder body is formed in the first component.

5. The vehicle sun visor equipped with the card holder according to claim 4, wherein:
the paired rails include vertical walls extending from the backside of the first component, and overhanging portions overhanging from end parts of the vertical walls to a back surface of the holder body such that the overhanging portions hold the two edges of the holder body; and
disengagement prevention portions projecting from the overhanging portions toward the backside of the first component are formed in end parts of the paired rails in a longitudinal direction and are configured to restrain the engaged portion from being disengaged from the engageable portion such that the disengagement prevention portions restrain the distal end of the holder body from moving in a direction distanced from the first component.

6. The vehicle sun visor equipped with the card holder according to claim 5, wherein:
the paired rails include guide recessed portions between the opening and the disengagement prevention portions; and
the guide recessed portions are configured to facilitate insertion of the holder body into the paired rails.

* * * * *